Dec. 30, 1969       C. L. HARBECK ET AL       3,486,436
VEHICLE CAB VENTILATOR
Filed March 21, 1968

Inventors
Charles L. Harbeck
Raymond N. Sellon Jr.

By Wheely, Wheely, House & Clemency

Attorneys

United States Patent Office 3,486,436
Patented Dec. 30, 1969

3,486,436
VEHICLE CAB VENTILATOR
Charles L. Harbeck, Pewaukee, and Raymond N. Sellon, Jr., Shorewood, Wis., assignors to Stolper Industries, Inc., Menomonee Falls, Wis., a corporation of Wisconsin
Filed Mar. 21, 1968, Ser. No. 715,097
Int. Cl. B60h 1/28
U.S. Cl. 98—2                                     7 Claims

ABSTRACT OF THE DISCLOSURE

A vehicle cab with an air inlet over the windshield is provided at a point near to but spaced rearwardly from the windshield with a roof-suspended housing extending transversely of the cab and provided with directionally controllable discharge means for filtered air, the housing containing a blower and suspended motor and an air filter surrounding the motor in a chamber comprising a cup-shaped closure downwardly removable, whereby the filter is readily interchangeable from the interior of the cab. Between the housing and the windshield is a valve chamber with a valve for selectively admitting either outside air or recirculated air to the filter.

Background of invention

Air cooling or heating means may be incorporated as suggested in a companion application, entitled "Air Conditioner for Heating, Cooling, and Pressurizing Vehicle Cabs," Ser. No. 711,687, filed Mar. 8, 1968, but the instant device is primarily designed to provide simple and effective means for circulating filtered air without regard to whether such air is heated or cooled.

Summary of invention

The blower and filter are located on the passenger's side of the vehicle where they will offer no obstruction to the vision of the driver. They are sufficiently far forward so that they do not limit the head room of the passenger. The motor and filter are in a sub-housing which may be partially within the main ventilating housing but which includes a depending removable closure to facilitate change of filter. This cover is detachably connected with the motor for support.

The control of air movement is greatly facilitated by the location of a simple shutter type valve which is pivoted near the plane of the windshield in a valve chamber which has a fresh air inlet and an inlet for recirculated air, said valve having a free rear end movable arcuately between one position in which the fresh air inlet is closed and another position in which the recirculation air inlet is closed. The valve chamber is generally triangular in section with a rear opening leading directly into the filter chamber at a level within the housing proper, so that there is no interference with the removable housing closure when the filter is changed.

Despite the relatively inaccessible location of the valve forwardly of the housing, it is readily operated in simple manner by a lever exposed within the cab and connected by Bowden wire with the valve.

Brief description of drawings

FIG. 1 is an elevation of a device embodying the invention as viewed from the cab.
FIG. 2 is a plan view of said device with the cab roof broken away, a horizontal section exposing the interior.
FIG. 3 is a view taken in section on line 3—3 of FIG. 2.

Description of preferred embodiment

The cab roof generally indicated by reference character 6 comprises a roof top panel 8 extending forwardly to a generally upright foraminous panel 10 which may extend completely across the cab and which communicates with an inlet plenum chamber 12. Below panel 10 the inlet plenum is closed by an imperforate panel 14 connected with the frame 16 of the windshield 18. The inlet plenum chamber 12 is located only at one side of the cab, being closed at one side by a front-to-rear partition 15 and having at its bottom the angled valve port plates 58 and 60 hereafter described.

The sound deadening and thermal insulation 20 confined between the top panel 8 and the cab ceiling 22 may end at 24 where the ceiling panel 22 connects to the top panel 8. Fastened to the ceiling panel at 26 is the rear wall 28 of a housing extending transversely of the cab and generally designated by reference character 30. A sub-housing may include an upward deformation of the bottom wall 32 to provide a part of filter chamber 34. The top wall 36 of the filter chamber has a large opening 38 affording communication between the filter chamber 34 and a volute fan housing 40 in which there is a centrifugal blower 42 driven by a motor 44 suspended by a bracket 45 which spans opening 38. The volute fan housing 40 has a tangential discharge passage 46 opening into the pressurized plenum space 48 which extends from the partition 50 all the way across the cab. The rear face of this plenum is provided by the aforesaid panel 28. In that panel, there are numerous air-directing discharge fittings 52 of generally conventional design.

The front wall 56 of the housing 30 is connected by ported plates 58 and 60 with the front wall panel 14 above described, the latter extending upwardly from the windshield frame. These plates form a valve chamber 61 opening rearwardly through port 76 into filter chamber 34.

The filter chamber 34 as shown by way of exemplification is only partly within the housing 30. It also extends downwardly into a cup-shaped closure 62 which removably supports a tubular filter 68. In the instant construction, a bracket 64 extends beneath the motor 44 and carries a wing nut 66 which may be removed to allow the closure 62 to be lowered, carrying with it tubular filter 68.

The diameter of the filter is smaller than the interior diameter of the filter chamber 34 so that air admitted to the filter chamber exteriorly of the filter can pass circuitously about the filter and will traverse the filter at any point to the interior thereof. The air will then pass upwardly across the motor 44, cooling the motor, and will move through the port 38 to the interior of the blower rotor 42 to be propelled by the rotor through the tangential passage 46 into the pressure plenum 48.

The air thus entering the filter chamber may be taken either from the outside through the foraminous plate 10, or from the cab through a port 70 in plate 60. Pivotally mounted by hinge 75 in the angle between the plates 58 and 60 is a valve plate 72 which, in the position shown in full lines in FIG. 3, closes the port in plate 58 to prevent outside air from entering the filter chamber. In the dotted line position of plate 72 shown in FIG. 3, the plate admits outside air but excludes the air of the cab from recirculation through port 70 of plate 10. Obviously the plate may be set in any desired intermediate position to apportion fresh air and recirculated air in any ratio.

On the top of the valve 72 is bracket arm 78 with which is connected the Bowden wire 80 having a sheath 82 extending across the volute fan housing 40 and thence curved downwardly to expose the wire 80 for connection with the control lever 84 mounted on the rear wall 28 of the housing 30.

What is claimed is:
1. A ventilator for a vehicle cab having a fresh air inlet, said ventilator comprising an elongated housing adapted to extend transversely across the top of such cab and provided with air distributing outlet means and with a downwardly opening sub-housing means adjacent one of its ends which includes at least a portion of a filter chamber and a fan casing having an inlet at its bottom and having a discharge passage into the housing first mentioned, a removable bottom closure for said filter chamber, an annular filter in said chamber, a motor disposed within the filter, a blower rotor operatively connected with said motor to be driven thereby and disposed in the fan casing, means providing a valve chamber having a first inlet port for fresh air, a second inlet port for recirculated air and a delivery port opening into the filter chamber a valve pivotally mounted in the valve chamber and selectively movable to open and close the respective ports for fresh air and recirculated air, and means mounted on said first mentioned housing for actuating said valve.

2. A vehicle cab ventilator according to claim 1 in which the filter chamber is within the housing first mentioned, said bottom closure having manually releasable means for physically connecting it with said motor for support therefrom, the annular filter being mounted on said closure and said closure being removable downwardly from the housing first mentioned for replacement of said filter.

3. The combination with a vehicle cab provided with a windshield and with a top spaced above the windshield, of a housing extending across the cab in a position spaced somewhat to the rear of the windshield and connected with said top, a wall extending above the windshield and connected with the top and at least part of which is foraminous to provide a fresh air inlet, partition means extending from said housing to said wall adjacent one end of the housing to provide a fresh air plenum, angularly related plates extending from said housing to said wall beneath said plenum, said plates having ports to provide valve openings for fresh air and recirculated air respectively, a valve plate pivoted in the angle between said angularly related plates and movable for control of air movement through the respective ports, means exposed in the cab at the rear of the housing for actuating said valve plate, and means for admitting air to the housing subject to control of said valve plate, the housing having means for delivering such air into the cab.

4. A combination according to claim 3 in which the last mentioned means includes a fan, said housing including means providing a filter chamber in the path of air moving toward said fan.

5. A combination according to claim 3 in which said valve plate has a bracket arm extending through the port of one of said angularly related plates, the actuating means therefor including a control lever at the rear of the housing and motion transmitting connections between the control lever and the bracket arm.

6. A combination according to claim 3 in which the housing has sub-housing means establishing a fan chamber and a part of a filter chamber, a bottom closure for the filter chamber having means removably supporting it from said housing, a tubular filter in the filter chamber supported on said closure and accessible for change upon removal of the closure, air admitted to the housing subject to the control of the valve plate being caused to enter the filter chamber through an opening with which the housing is provided in communication with the filter chamber, the fan casing above the filter chamber having an opening through which air which has traversed the filter will enter the fan casing, and a fan in the fan casing provided with a motor disposed in the filter chamber centrally of the filter.

7. The combination with a vehicle cab provided with a windshield and a top, of a housing extending across the cab behind the windshield, means providing a subhousing which includes a fan chamber and a part of a filter chamber opening into the fan chamber, an annular filter in the filter chamber, a closure detachably connected with the subhousing and removably adapted to afford access to the filter, a motor disposed within the annular filter, a fan operatively connected with the motor and disposed in the fan chamber, and air control port and valve means for controlling admission of air into the filter chamber about the filter to be drawn by said fan through the filter, said fan chamber having air discharge means communicating with said cab for delivery thereto of the filtered air.

References Cited

UNITED STATES PATENTS

| 2,036,485 | 4/1936 | Lintern | 98—2 |
| 2,158,332 | 5/1939 | Lintern | 98—2 |
| 2,796,820 | 6/1957 | Moore | 98—2.4 |

MEYER PERLIN, Primary Examiner

U.S. Cl. X.R.

98—10, 14